(12) United States Patent
Quilliard et al.

(10) Patent No.: US 7,331,188 B2
(45) Date of Patent: Feb. 19, 2008

(54) METHOD FOR CONTROLLING AN HVAC SYSTEM

(75) Inventors: Julien Quilliard, Metz (FR); Jean-Francois Launois, Bonnert (BE); Jean-Claude Petesch, Kehlen (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/340,200

(22) Filed: Jan. 10, 2003

(65) Prior Publication Data

US 2003/0140642 A1     Jul. 31, 2003

(30) Foreign Application Priority Data

Jan. 25, 2002    (GB)   .................. 0201598.0

(51) Int. Cl.
     *F25D 21/00*      (2006.01)
     *B60S 1/54*      (2006.01)

(52) U.S. Cl. .................. 62/150; 62/80; 454/127

(58) Field of Classification Search .................. 62/180, 62/80, 150, 157, 228; 454/121, 75, 127
See application file for complete search history.

(56) References Cited

U.S. PATENT DOCUMENTS

| | | | |
|---|---|---|---|
| 4,896,589 A | 1/1990 | Takahashi | .................. 62/176.6 |
| 5,624,310 A | 4/1997 | Fredriksson et al. | ........ 454/121 |
| 5,743,099 A * | 4/1998 | Kraynak et al. | .............. 62/150 |
| 6,112,807 A * | 9/2000 | Dage | .......................... 165/202 |
| 6,293,116 B1 | 9/2001 | Forrest et al. | |
| 6,434,958 B1 | 8/2002 | Koors et al. | |
| 6,508,408 B2 | 1/2003 | Kelly et al. | |

OTHER PUBLICATIONS

Patent Abstracts of Japan vol. 008, No. 262 (M-341), Nov. 30, 1984 & JP 59 134006 A (Nissan Jidosha KK), Aug. 1, 1984 abstract.

* cited by examiner

*Primary Examiner*—Marc Norman
(74) *Attorney, Agent, or Firm*—Patrick M. Griffin

(57) ABSTRACT

A method for controlling a heating, ventilation and air-conditioning (HVAC) system having an air vent associated with a window for blowing an air flow of controlled temperature thereon; the HVAC system having a refrigeration unit with a compressor and an evaporator, and blowing means for forcing air over the evaporator to the air vent. The method includes a first step (a) of activating the compressor while deactivating the blowing means during a first period for condensing moisture of the air contained in the HVAC system. The method includes a further step (b) comprising, at the expiry of the first period, activating the blowing means and keeping the compressor active during a second period for sufficiently reducing the dew-point temperature of air blown by the HVAC system, and deactivating the compressor at the expiry of the second period.

14 Claims, 1 Drawing Sheet

METHOD FOR CONTROLLING AN HVAC SYSTEM

FIELD OF THE INVENTION

The present invention generally relates to a method for controlling an HVAC system, in particular an HVAC system of a vehicle.

BACKGROUND OF THE INVENTION

Most vehicles are now equipped with a heating, ventilation and air-conditioning (HVAC) system for maintaining the air within the passenger compartment at a set desired temperature.

A problem that can occur in such vehicles equipped with an HVAC system, is that when the vehicle is left at stand-still after having used the HVAC refrigeration unit (i.e. operated the HVAC in the air-conditioning (A/C) mode), and then re-used after a certain period of time, large quantities of moisture laden air may be blown onto the windscreen if the HVAC system is set to windscreen defrost. This moisture laden air may condense on the glass area inside the car, thereby causing sudden fogging (often referred to as flash fogging) and thus reducing the driver's visibility.

This fogging effect is mainly caused by the evaporator of the HVAC refrigeration unit having become chilled during previous operation in the A/C mode, and therefore having a considerable amount of water condensed on the evaporator surface. During a vehicle stand-still or deactivation of the HVAC refrigeration unit, the evaporator warms up above ambient air temperature and the large quantities of water on the surfaces saturate the warmer air in the HVAC system around the evaporator. If the blower of the HVAC system is started in this condition, the moisture laden air is carried away from the evaporator and if air comes out from the defrost vent, then the moisture is deposited on the glass area.

In order to minimise fogging problems in vehicles equipped with an automatic climate control (ACC) unit for controlling the HVAC system, the ACC unit is generally programmed to blow air through the floor vents at vehicle start-up. Hence, the very moist air is not directed to the windscreen. It has however been observed that a certain amount of moisture laden air flows through the defrost vent—which cannot be tightly closed—so that windscreen fogging often still occurs. Furthermore, to rapidly reduce the moisture in the blown air, the ACC is generally programmed to operate the refrigeration unit (i.e. activating the compressor) from engine start-up; and to avoid re-fogging due to stopping of the refrigeration unit, the compressor is kept permanently active. Unfortunately, the permanent use of the refrigeration unit has a significant impact on fuel consumption, and is thus disadvantageous from both economical and environmental points of view. It is further to be noted that, at outside temperatures that will cause window fogging (typically between 3 and 15° C.), the air-conditioning, if it was not for preventing fogging, would normally be off, since a heated air flow is normally delivered by the HVAC system.

In order to avoid flash fogging, it is known to provide the defrost vent with a flap that can tightly close the defrost vent. However, the use of such a flap complicates the design of the HVAC system, increases its dimensions and its manufacturing costs.

U.S. Pat. No. 5,983,649 also addresses the fogging problem at engine start-up, and proposes to disable the HVAC blower, while the compressor of the refrigeration unit is activated to cool the evaporator. As soon as the evaporator has reached a sufficiently low temperature for condensing the moisture of the air contained in the HVAC system—which could need 10 to 18 seconds—the blower is switched on. This method does indeed avoid blowing moist air into the passenger compartment. At the end of this specific start-up sequence, the HVAC system is operated according to the main comfort programs, which thus typically keep the compressor active but deliver heated air flows. Indeed, deactivating the compressor when turning the blower on—i.e. after 10 to 18 seconds from engine start-up—would also, in most cases, cause fogging of the window. Hence, if the method of U.S. Pat. No. 5,983,649 provides an interesting solution for preventing fogging at engine start-up, it does not address the problem of fogging that often occurs when switching off the A/C mode (i.e. deactivating the compressor).

OBJECT OF THE INVENTION

The object of the present invention is to provide an improved method for controlling an HVAC system, which prevents fogging and allows energy savings. This object is achieved by a method as claimed in claim 1.

SUMMARY OF THE INVENTION

The present invention relates to a method for controlling a heating, ventilation and air-conditioning (HVAC) system, the HVAC system having an air vent associated with a window for blowing an air flow of controlled temperature thereon. The HVAC system has a refrigeration unit with a compressor and an evaporator, and blowing means for forcing air over the evaporator to the air vent. The method includes a first step (a) of activating the compressor while deactivating the blowing means during a first period for condensing moisture of the air contained in the HVAC system.

According to an important aspect of the invention, the method includes a further step (b) comprising, at the expiry of the first period, activating the blowing means and keeping the compressor active during a second period for sufficiently reducing the dew-point temperature of air blown by the HVAC system, and then deactivating the compressor at the expiry of the second period.

Step (a) allows condensing the moisture of the air initially contained in the HVAC module, so that when the blowing means are activated at step (b), the air blown by the HVAC system will not cause fogging of the window. In the next step (b), the compressor is kept active for a certain period of time for decreasing the dew-point temperature of air blown by the HVAC system to a certain point, before being turned off. A merit of the present invention is to have found that the dew-point temperature of air blown by the HVAC system is a criterion that allows determining the moment at which the compressor can be deactivated, without provoking a subsequent fogging. The present method is thus particularly advantageous, since stopping the compressor allows substantial fuel savings. In addition, the current practice has used the refrigeration unit in permanence in the sole purpose of avoiding fogging problems, whereas, at the outside temperatures at which window fogging may occur, it is not at all required to cool the incoming air, and the HVAC system will generally be set to deliver heated air.

To minimise water accumulation on the evaporator, the second period should advantageously be as short as possible, which means that the compressor should preferably be deactivated as soon as the dew-point is determined as having sufficiently decreased after activation of the compressor at step (a). In the practice of the present method, it is considered that the compressor can be deactivated when the dew-point temperature of the air blown by the HVAC system is below the temperature of the window on which the air is to be blown through the air vent by at least a predetermined temperature value. This predetermined temperature value is preferably of 10° C., more preferably 15° C.

Therefore, the method preferably includes monitoring a parameter indicative of the dew-point temperature of air in the HVAC system and a parameter indicative of the temperature of the window. The end of the second period is thus determined on the basis of these two parameters.

It is to be noted that for more precision, this predetermined temperature value can be made dependent on the outside temperature.

Alternatively, the end of the second period may be determined by the expiry of a timer of predetermined duration, which corresponds to the time estimated for the dew-point temperature of air blown by the HVAC system to decrease by at least a predetermined temperature value below the window temperature. The predetermined temperature value is preferably of 10° C., more preferably of 15° C. This predetermined duration can be obtained by testing, and will generally be specific for a given type of HVAC system. If desired, the timer duration can be made dependent on the outside temperature.

The end of the first period of step (a) may be determined by the expiry of a timer of predetermined duration, thereby allowing for moisture condensation. Again, the duration of this timer may be determined by testing and will generally be specific for a given type of HVAC system. If desired, the timer duration can be made dependent on the outside temperature.

However, when the HVAC system is configured for monitoring the parameter indicative of the dew-point and the parameter indicative of the window temperature, the end of step (a) can also be determined on the basis of these two parameters. Accordingly, step (a) is preferably stopped as soon as the dew-point temperature of air in the HVAC system has decreased below the window temperature.

Since flash fogging is generally observed for outside temperatures between 3 to 15° C., the start of step (a) may be made conditional upon outside temperature range. Preferably, step (a) is started when an outside temperature is in the range of 2 to 20° C., which should prevent any fogging.

The present method is particularly well adapted to be applied to the control of an HVAC system associated with a vehicle compartment for controlling the climate therein and to avoid fogging on the windscreen at engine start-up, the HVAC having a defrost vent for blowing air onto the windscreen. Since flash fogging will generally only occur when the vehicle has been left at stand-still for a certain period of time, the method may include a dormant timer, and step (a) will then only be started if the dormant timer has not expired. The duration of such a timer may be of about 12 hours.

In the case of a vehicle HVAC system, the latter typically includes a floor vent directing air away from the windscreen, and the HVAC system should preferably be operated to allow distribution of air through both this floor vent and the defrost vent during step (b).

In addition, a vehicle HVAC system is also typically capable of recirculating blown air and/or take in fresh air. The HVAC system is then advantageously operated to only recirculate air during step (a), so as to prevent the so-called ram effect if the vehicle begins to move quickly, i.e. air being pushed through the HVAC fresh air intake on forward movement of the vehicle.

At the end of step (b), the HVAC system can then be controlled according to the normal comfort programs. As already mentioned, considering the outside temperature e.g. between 3 and 15° C., the control unit associated with the HVAC unit will normally operate the HVAC system in a defrost mode, which typically involves blowing heated air onto the windscreen. Since, at the end of step (b), the dew-point of air is far below the windscreen temperature and very small quantities of moisture have been accumulated on the evaporator, and since the windscreen temperature will progressively increase, there is no risk of fogging subsequent to the deactivation of the compressor.

BRIEF DESCRIPTION OF THE DRAWINGS

The present invention will now be described, by way of example, with reference to the accompanying drawing, in which.

DETAILED DESCRIPTION OF A PREFERRED EMBODIMENT

Figure 1:
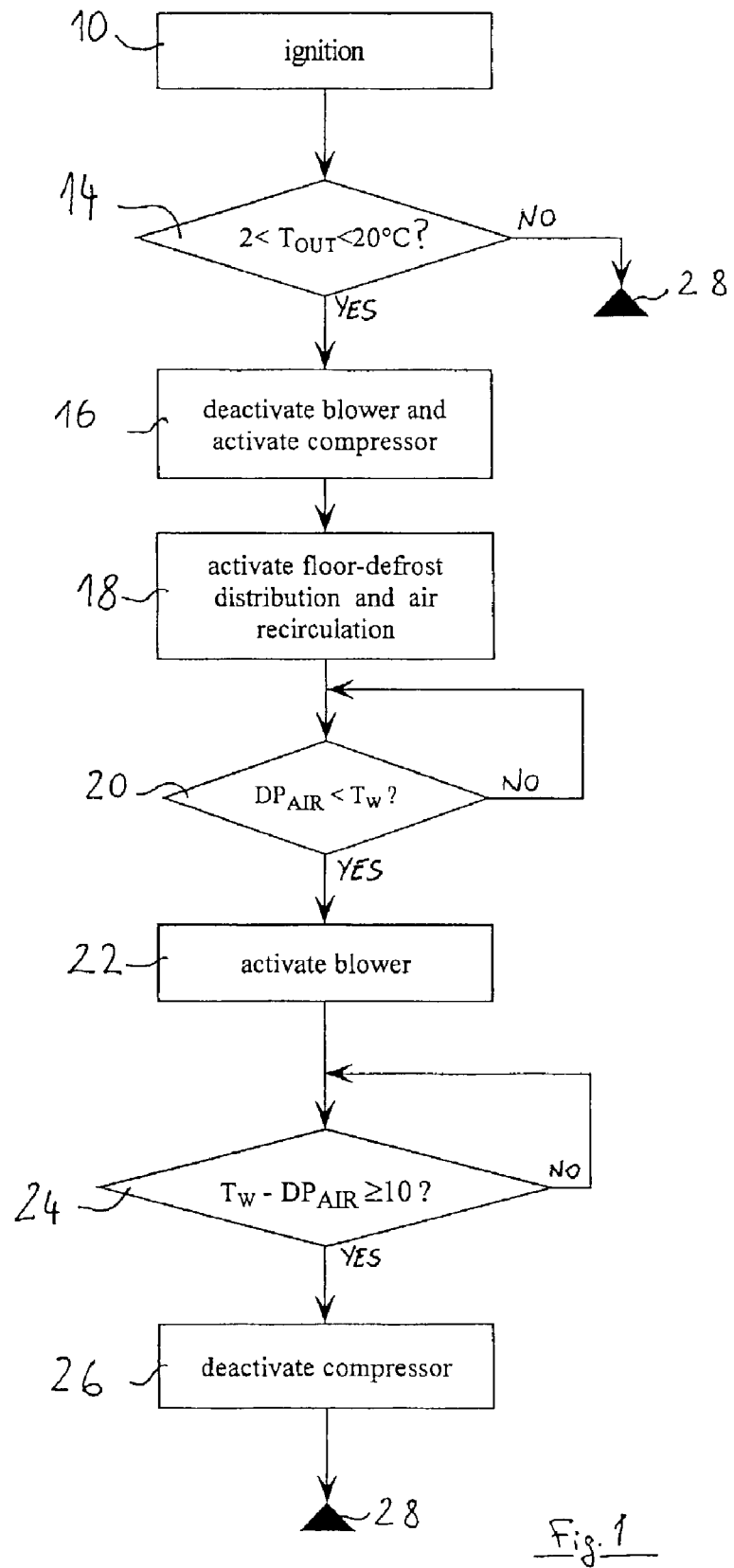
FIG. 1: is a flow chart illustrating a preferred embodiment of the present method.

The present method for controlling a HVAC system will now be described with reference to a vehicle HVAC system for controlling the climate within the passenger compartment.

An HVAC system conventionally comprises ducting having an ambient air inlet duct to receive ambient or fresh air from outside the vehicle, and a recirculation duct to receive air from the passenger compartment. The air can be drawn into the HVAC system by a blower driven by an electric motor.

In the HVAC system, the air can be preconditioned by means of a refrigeration unit and heating means. The refrigeration unit normally has a compressor, a condenser, an expansion valve and an evaporator connected by piping to circulate refrigerant in this refrigerant loop, as is well known in the art. The compressor is driven either by the engine or an electric motor and the evaporator is installed in the ducting, where, due to the evaporation process, heat is extracted from the incoming stream of fresh air passing over the evaporator, thereby cooling air.

The heating means generally includes a heater core installed downstream of the evaporator in the ducting. The heater core is connected to the water cooling system of the engine, so that it is heated by coolant from the engine. The flow of engine coolant to the heater core may be controlled by a thermostatic valve. The proportion of air passing over the heater core is controlled by a first distributor in the form of a gate valve, generally known as heater flap, operated by an actuator.

The heated air (if any) and non-heated air is remixed in a mixing chamber upstream of a second distributor, referred to as distributor flap, and is then discharged into the passenger compartment via a number of outlet ducts leading to different zones of the passenger compartment. The outlet ducts terminate by air vents named after their location in the compartment, such as facial vents, defrost vents and floor vents.

The distributor flap is actuated by an actuator, to determine the air distribution between the facial, defrost and floor vents.

The ratio of recirculated air to fresh air entering the HVAC ducting is controlled by a third distributor, referred to as recirculation flap, operated by an actuator.

The HVAC system is generally controlled by an automatic climate control unit including computing means in communication with a number of sensors inside the HVAC system and the passenger compartment, and including a user interface that allows the driver/passengers to switch between manual settings and automatic modes.

As has been explained, the operation of the refrigeration unit condenses water on the evaporator. After vehicle standstill, this condensed water evaporates and in certain conditions remains inside the HVAC system. Then, when the air flow is directed to the windscreen at next vehicle start-up, this remaining vapour may cause the sudden fogging of the windscreen, which generates unsafe and uncomfortable conditions that may hinder the driving of the vehicle.

The present method allows to prevent sudden window fogging of the windscreen at vehicle start-up, and is especially interesting when the HVAC design does not allow to close the defrost vent.

Basically, to prevent sudden windscreen fogging, the present method for controlling the HVAC system comprises the steps of:

(step 1) at vehicle ignition, stop vehicle ventilation and engage the A/C for a predetermined period of time or until at least one further parameter relevant to A/C performance has reached a predetermined threshold value; and (step 2) as step 1 is completed, start HVAC ventilation at a predetermined level and keep A/C engaged for a predetermined period of time or until at least one further parameter relevant to windscreen fogging condition has reached a predetermined threshold value.

A preferred embodiment of the present method will now be explained in more detail with reference to FIG. 1. This method is advantageously programmed in the ACC unit, so that it can be implemented by this unit from vehicle start-up.

The first step 10 of the method is monitoring engine ignition, from which moment the ACC unit should begin its control of the HVAC unit. This can be done by monitoring the starter motor by means of a sensor and then monitoring engine speed to check if the engine has started.

Upon ignition, it is preferably checked whether the outside temperature is in the range in which windscreen fogging is likely to occur. Accordingly, query step 14 verifies whether the outside temperature $T_{OUT}$ is in the range of 2 to 20° C.

If the response to step 14 is negative, then there is no risk of fogging and a return to main comfort programs 28 follows.

If the answer to query step 14 is positive, the blower is immediately deactivated while the compressor is activated (step 16). It is to be noted that the activation of the compressor may be delayed by a few seconds from the detection of ignition at step 10, to allow the engine reaching stable running conditions. Deactivating the blower will avoid blowing moist air contained in the HVAC ducting due to evaporation of water condensed on the evaporator. Furthermore, activating the compressor will cool the evaporator, so that the moisture of air contained in the HVAC ducting will condense.

Preferably, the present method further includes a step 18 of actuating the distribution flap to activate the combined floor/defrost distribution mode. In addition, the recirculation flap is preferably activated into the recirculation-only position. This is to prevent the so-called ram-effect if the vehicle begins to move quickly; that is air being pushed through the fresh air intake on forward movement of the vehicle.

The next query step 20 is designed to maintain the conditions of steps 16 and 18 for a certain period, which will allow the evaporator to reach a sufficiently low temperature for condensing a large part of the moisture in the HVAC ducting.

It will be appreciated in the present embodiment, it is considered that the moisture of air is sufficiently reduced when the dew-point temperature of air $DP_{AIR}$ in the HVAC unit decreases below the temperature of the windscreen $T_W$. Therefore, the dew-point of air $DP_{AIR}$ is monitored as well as the windscreen temperature $T_W$. The dew-point of air $DP_{AIR}$ can be obtained from a measure of temperature and of hygrometry in the HVAC ducting. The windscreen temperature $T_W$ can be obtained by a temperature sensor mounted to the inner side of the windscreen.

Accordingly, query step 20 compares the dew-point temperature of air $DP_{AIR}$ in the HVAC unit with the temperature of the windscreen $T_W$. It will generally take about 15 to 60 seconds for the dew-point of air $DP_{AIR}$ to become inferior to the windscreen temperature $T_W$.

If the query step 20 is positive, then, at next step 22, the blower is activated, preferably at a predetermined low level, while the compressor is still active. This allows blowing a weak flow of relatively dry air onto the windscreen.

Following the activation of the blower, the dew-point of air blown by the HVAC $DP_{AIR}$ as well as the windscreen temperature $T_W$ are again monitored, and these temperatures are compared in the next query step 24. Indeed, it has been found that the dew-point temperature of air blown by the HVAC system is a criterion that allows determining the moment at which the compressor can be deactivated, without causing subsequent fogging. In the present method, it is considered that a decrease of the dew-point of air $DP_{AIR}$ to at least 10° C., preferably about 15° C., below the windscreen temperature $T_W$ is sufficient to avoid window fogging at compressor shut-off. As soon as a positive response to step 24 is obtained, which will generally not take more than sixty seconds, the compressor is deactivated (step 26), and return to main comfort programs 28 follows.

It will be understood that at step 26, the compressor will normally only have been active for a short period of time, typically less than two minutes from the compressor activation at step 16, so that the amount of water condensed near the evaporator is low. There is no risk of fogging due to the fact that at the moment the compressor is deactivated, the dew-point of air blown by the HVAC is very low. With time, the dew-point will progressively increase, since the evaporator will heat up due to compressor deactivation. But since fresh outside air can only contain small amounts of water and the windscreen will also progressively heat-up, there is still no risk of fogging during the rest of the journey.

It remains to be noted that, in case a risk of fogging has been identified (step 14), the present method could comprise a final step (following step 26) of automatically switching to a defrost comfort program, which mainly involves increasing the blower speed and actuating the distribution flap to blow heated air onto the windscreen through the defrost vent. This defrost program should also include the deactivation of the air recirculation mode.

It will be understood that preventing window fogging is a matter of security, and that the present method should preferably have priority over the other comfort programs programmed in the ACC unit. This means that it should preferably be implemented at every engine start-up before any other comfort program.

In the present embodiment of the method, the dew-point temperature of air $DP_{AIR}$ and the windscreen temperature $T_W$ are preferably measured by dedicated sensors. It is however also possible to perform steps 20 and 24 with estimated values of these temperatures.

The invention claimed is:

1. A method for controlling a heating, ventilation and air-conditioning (HVAC) system having an air vent associated with a window for blowing an air flow of controlled temperature thereon; said HVAC system having a refrigeration unit with a compressor and an evaporator, and blowing means for forcing air over said evaporator to said air vent, said method including a first step (a) of activating said compressor while deactivating said blowing means during a first period for condensing moisture of the air contained in said HVAC system;

characterised by a further step (b) comprising, at the expiry of said first period, activating said blowing means and keeping said compressor active during a second period for sufficiently reducing the dew-point temperature of air blown by said HVAC system, and deactivating said compressor at the expiry of said second period.

2. The method according to claim 1, characterised in that step (b) includes monitoring a parameter indicative of the dew-point temperature of air blown by said HVAC system and a parameter indicative of the temperature of said window; and said second period ends when it is determined, based on said monitored parameters, that the dew-point temperature of air blown by said HVAC system is below the temperature of said window by at least a predetermined temperature value.

3. The method according to claim 2, characterised in that said predetermined temperature value is 10° C., preferably 15° C.

4. The method according to claim 2, characterised in that said predetermined temperature value depends on the outside temperature.

5. The method according to claim 1, characterised in that said second period ends at the expiry of a predetermined timer, the duration of which corresponds to the time estimated for the dew-point temperature of air blown by said HVAC system to decrease by at least a predetermined temperature value below said window temperature.

6. The method according to claim 5, characterised in that said duration of said predetermined timer of step (b) depends on the outside temperature.

7. The method according to claim 1, characterised in that at step (b) said blowing means is operated at a predetermined low level.

8. The method according to claim 1, characterised in that
step (a) includes monitoring a parameter indicative of the dew-point temperature of air in said HVAC system and a parameter indicative of the temperature of said window; and said first period ends when it is determined, based on said monitored parameters, that the dew-point temperature of air in said HVAC system is below the temperature of said window.

9. The method according to claims 1, characterised in that said first period ends at the expiry of a timer of predetermined duration.

10. The method according to claim 1, characterised in that step (a) is initiated when the outside temperature falls within a predetermined temperature range, preferably between 2 and 20° C.

11. The method according to claim 1, characterised in that step (a) is initiated when the HVAC system has been at stand-still for predetermined duration.

12. The method according to claim 1, wherein said HVAC system can recirculate blown air and/or take in fresh air, characterised in that during step (a), the HVAC system is set to air-recirculation only.

13. The method according to claim 1, characterised in that after step (b), a heated air flow is delivered by said air vent to heat up said window.

14. The method according to claim 1, wherein said HVAC system is associated with a vehicle compartment for controlling the climate therein, and said vent is a defrost vent associated with a windscreen of said vehicle.

* * * * *